United States Patent [19]

Ezell et al.

[11] 4,387,781

[45] Jun. 14, 1983

[54] ELECTRICAL GENERATING SYSTEM FOR VEHICLES

[76] Inventors: Harry E. Ezell; Norwood B. Ezell, both of P.O. Box 9008, Mobile, Ala. 36691

[21] Appl. No.: 230,866

[22] Filed: Feb. 2, 1981

[51] Int. Cl.³ .......................................... B60K 25/10
[52] U.S. Cl. .................................... 180/65 B; 320/61
[58] Field of Search ............... 180/65.3; 74/89.19, 74/131, 167, 168, 33; 192/81 C; 320/61

[56] References Cited

U.S. PATENT DOCUMENTS

| 264,785 | 9/1882 | Sterling | 192/81 C |
|---|---|---|---|
| 407,385 | 7/1889 | Wilsey | 74/131 |
| 627,117 | 6/1899 | Heen | 74/168 |
| 1,557,570 | 10/1925 | Eckman et al. | 180/65 D |
| 3,981,204 | 9/1976 | Starbard | 180/65 D |
| 4,032,829 | 6/1977 | Schenavar | 180/65 D |
| 4,113,047 | 9/1978 | Turner | 180/65 D |

FOREIGN PATENT DOCUMENTS 651202  2/1929  France .......................... 180/65 D Primary Examiner—Joseph F. Peters, Jr.
Assistant Examiner—Kenneth R. Rice
Attorney, Agent, or Firm—Newton, Hopkins & Ormsby

[57] ABSTRACT

Usually wasted kinetic energy derived from relative movements of the vehicle wheels and chassis frame is converted into usable electric energy by the operation of a simplified chassis-mounted mechanical drive operatively coupled with alternators or generators through a pair of oppositely active and inactive transmission devices driven by a common rotary element, such as a gear.

9 Claims, 7 Drawing Figures

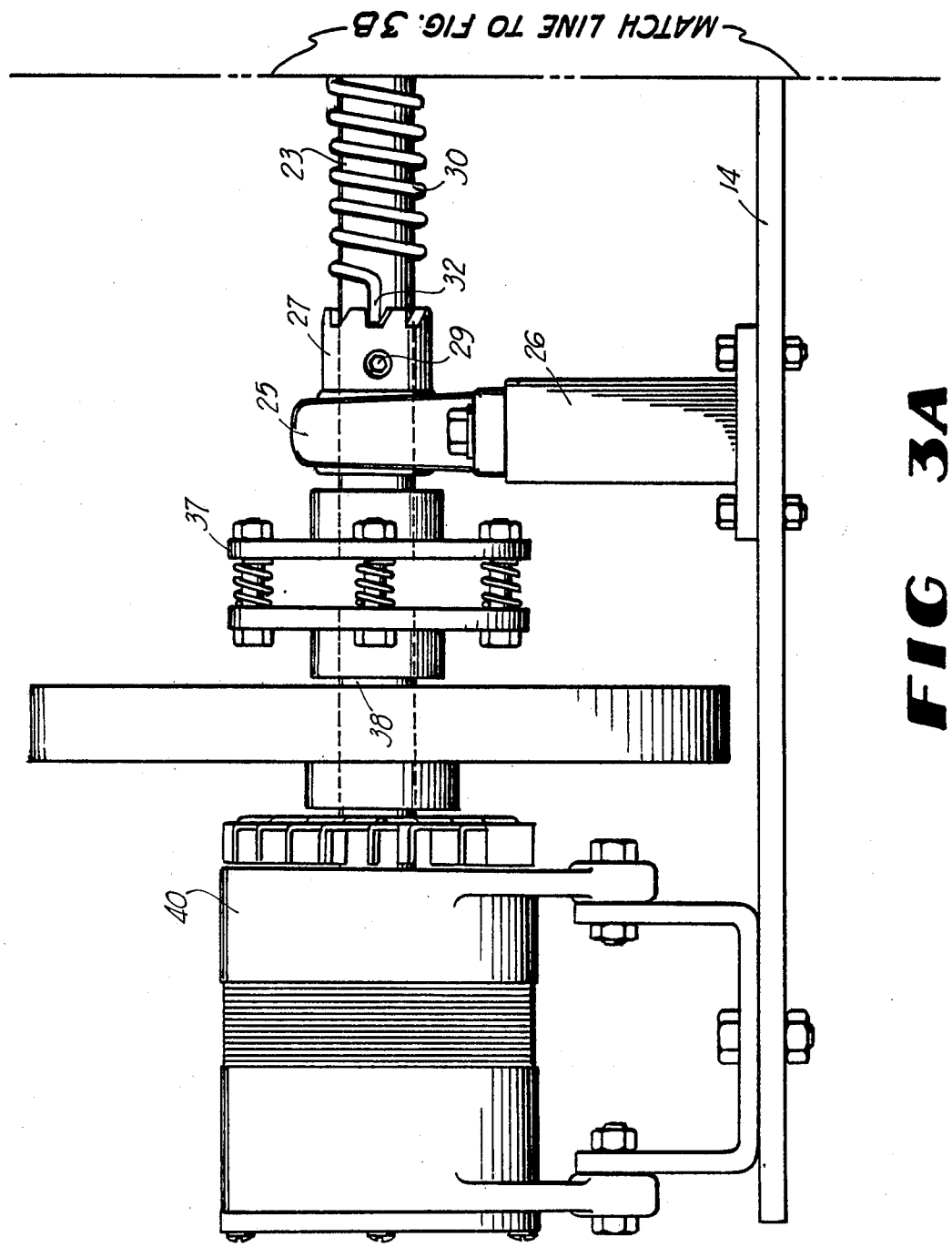

ELECTRICAL GENERATING SYSTEM FOR VEHICLES

BACKGROUND OF THE INVENTION

Devices have been proposed in the prior art to utilize normally wasted energy derived from the bouncing movement of vehicle wheels to generate electrical energy which can be utilized to charge a battery or directly operate a drive motor. One such system is shown in U.S. Pat. No. 3,880,250 to Emanuele. The objective of this invention is to provide a more practical, more simplified and less expensive means for this purpose, as well as a means which is essentially mechanical and sufficiently rugged and durable to withstand the rigors of automotive vehicle application.

The system disclosed in the Emanuele patent is much more complex and costly and involves, among other things, wheel operated air pumps, an air compressor, an accumulator tank, solenoid valve and an air turbine. In contrast to this, the present invention employs a very simple and purely mechanical alternator or generator drive which directly responds to vehicle wheel displacement and converts linear movement into rotary movement for driving electrical alternator or generator means mounted on the chassis frame of the vehicle.

Other features and advantages of the invention will become apparent during the course of the following detailed description.

BRIEF DESCRIPTION OF THE DRAWINGS

FIGS. 3A and 3B together are a side elevational view of a mechanical drive according to the invention taken on line 3—3 of FIG. 1.

DETAILED DESCRIPTION

Figure 3B:
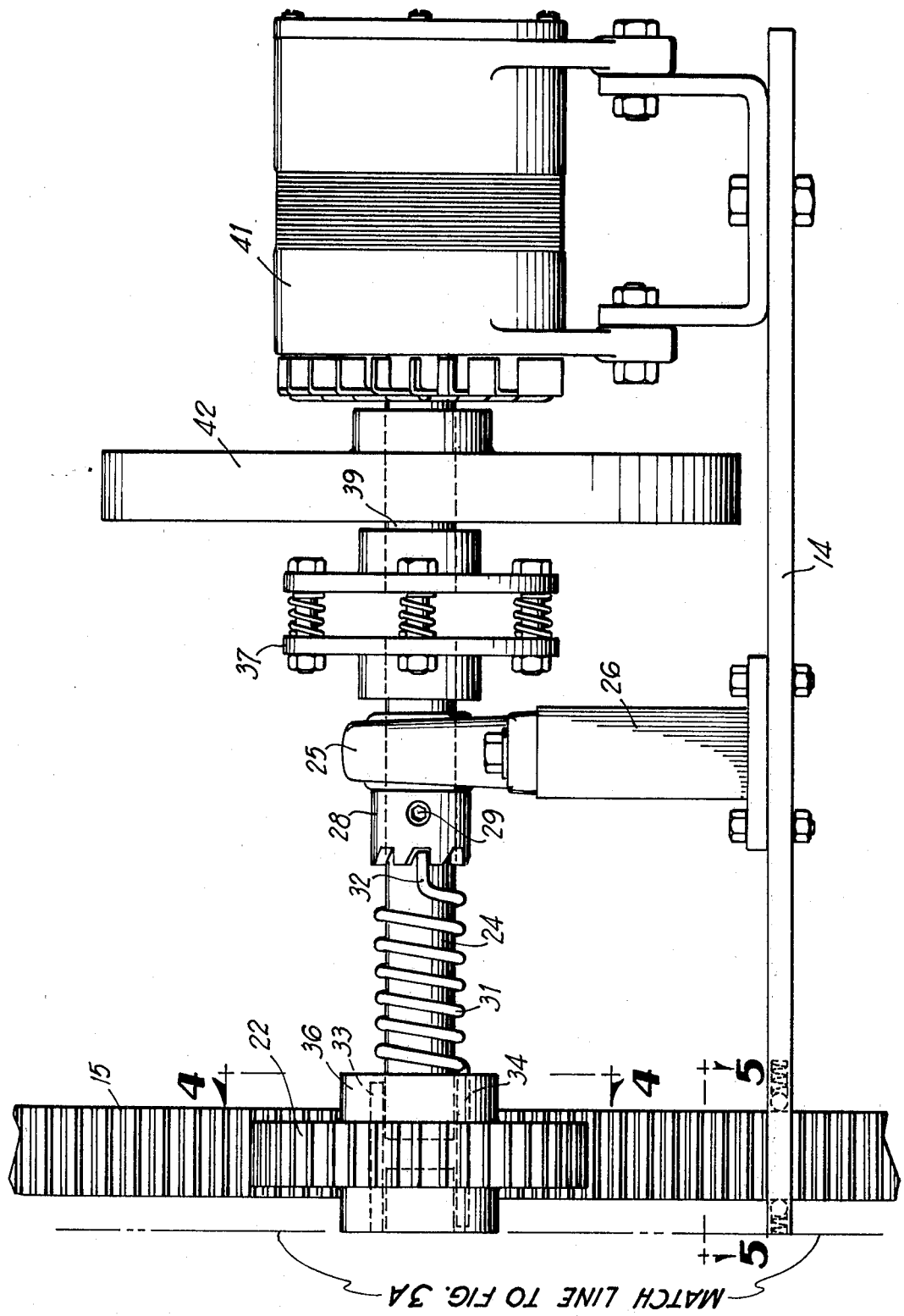

Referring to the drawings in detail wherein like numerals designate like parts, an automotive vehicle axle beam 10 carrying a conventional wheel 11 is connected through a spring suspension 12 with the chassis or main frame 13 of the vehicle having a horizontal platform extension 14 on which the driven components of the invention shown primarily in FIGS. 3A and 3B are mounted.

Figure 1:
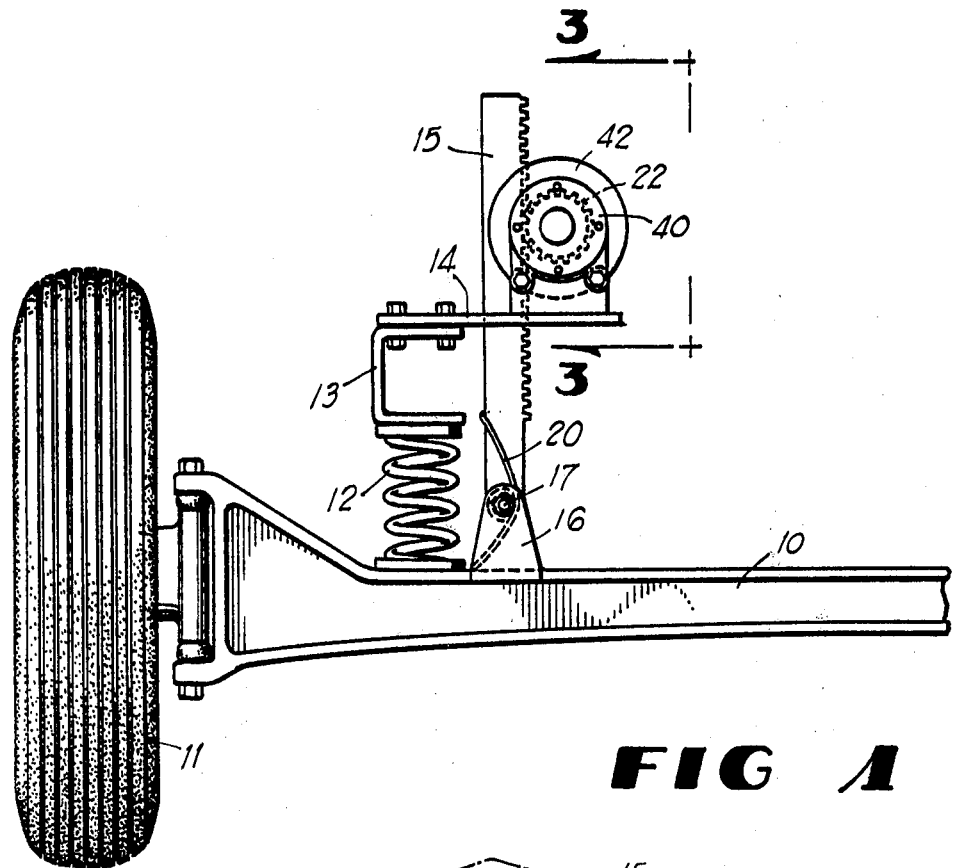
FIG. 1 is a fragmentary front elevation of the invention shown in association with a vehicle chassis frame and axle.
Figure 2:
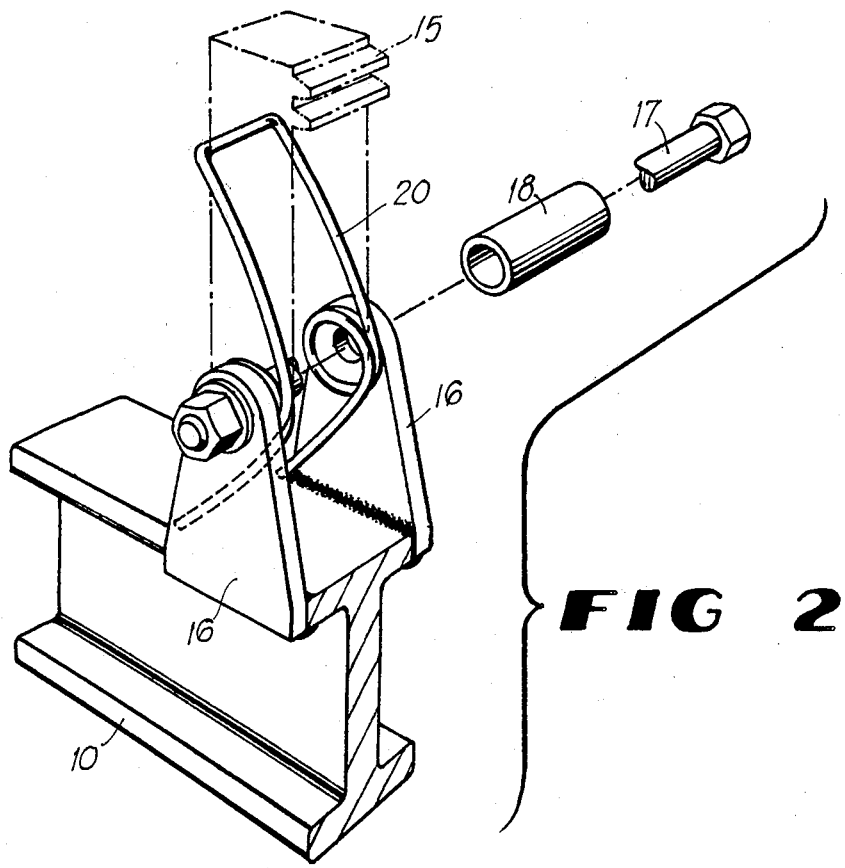
FIG. 2 is an enlarged fragmentary exploded perspective view, partly in section, showing the mounting of a rack bar on the vehicle axle.
Figure 5:
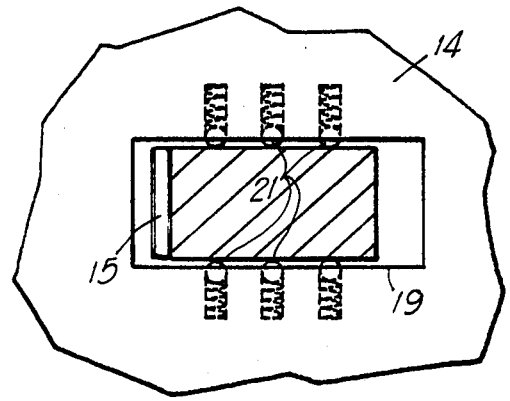
FIG. 5 is an enlarged fragmentary horizontal section taken on line 5—5 of FIG. 3B.

A rack bar 15 arranged vertically is disposed near and inwardly of chassis frame member 13 and directly above axle beam 10. The lower end of rack bar 15 is disposed between a pair of rigid upstanding lugs 16 rising from the axle beam 10 and pivoted thereto by the pivot structure shown in FIG. 2 including a pivot bolt 17 and a surrounding bearing sleeve 18. The rack bar 15 rises through a clearance opening 19, FIG. 5, formed in the platform extension 14 and is biased in one direction on its pivot axis by a biasing spring 20. The rack bar is further stabilized during its up and down linear movements by all bearing means 21 held in the platform extension 14 and acting on the opposite side faces of the rack bar, FIG. 5.

The gear teeth of the rack bar are held in mesh with the teeth of a pinion 22 freely rotatably mounted on the pair of separate shafts 23 and 24 disposed in coaxial spaced relationship above and parallel to the chassis frame member 13. The shafts 23 are journaled in sturdy support bearings 25 whose pedestals 26 are secured to platform extension 14.

Figure 4:
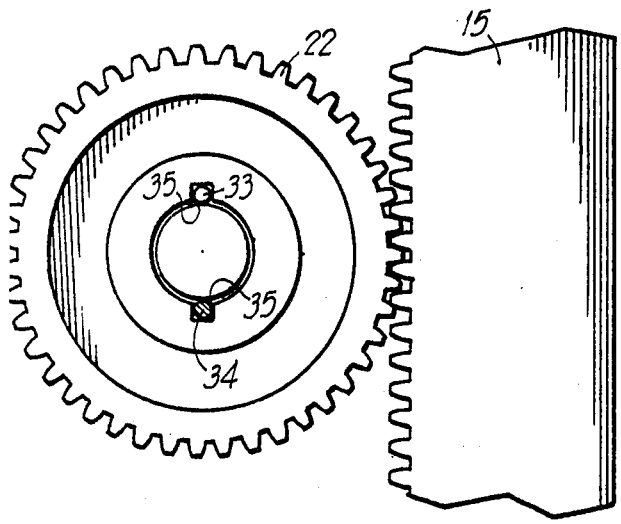
FIG. 4 is an enlarged fragmentary vertical section taken on line 4—4 of FIG. 3B.

Immediately inwardly of the bearings 25, shaft driving toothed ratchet collars 27 and 28 are fixed to the respective shafts 23 and 24 by set screws 29. Driving springs 30 and 31 cylindrical or rectangular in cross-section snugly surround the two shafts 23 and 24 alternatively binding and releasing the said shafts, with respective ends 32 thereof engaged drivingly with the ratchet teeth of collars 27 and 28 for opposite rotational driving under influence of the pinion 22. As best shown in FIG. 4, the inner end terminals 33 and 34 of the two drive springs are engaged in grooves 35 formed in the hub 36 of pinion 22. As can be readily seen, rotation of the pinion 22 by rack bar 15 in one direction will drive one of the shafts 23 or 24 in rotation and rotation of the pinion in the opposite direction will similarly drive the other shaft. Each spring 30 or 31 can drive its associated ratchet collar 27 or 28 in one direction only through engagement of its terminal 32 with the teeth of the collar. In the opposite direction of rotation, the spring ends of terminals 32 will skip over the ratchet teeth.

On the other sides of bearings 25, couplings 37 serve to connect the shafts 23 and 24 with the shafts 38 and 39 of twin opposing electrical alternators 40 and 41, or generators. These latter shafts are connected with flywheels 42, as illustrated.

If desired, the rack bar 15, pinion 22, shafts 23, 24, bearings 25, couplings 37 and shaft 39 can be enclosed by a housing (not shown) and immersed in oil or grease. It is readily apparent that with the described apparatus the alternators or generators 40 and 41 are alternately driven by the action of rack bar 15 and the common single pinion 22 as the vehicle axle beam 10 rises an falls during normal vehicle operation. Since the flywheels 42 will maintain their respective alternators 40 and 41 rotating, both alternators 40 and 41 should be supplying current at all times during vehicle operation and such current can be utilized in a conventional manner. If the vehicle is powered by an internal combustion engine, the efficiency of the engine will be increased because the energy normally utilized to operate the alternator or generator is not taken from the engine, but instead is derived from the relative motion between axle beam 10 and chassis frame 13. Thus, normally wasted kinetic energy is employed to power the electrical generating system through a simplified and positive purely mechanical system. If the vehicle is electrically battery operated, the alternators 40 and 41 can supply electricity to the main batteries (not shown). The time and cost of recharging the batteries, therefore, will be reduced.

Figure 6:
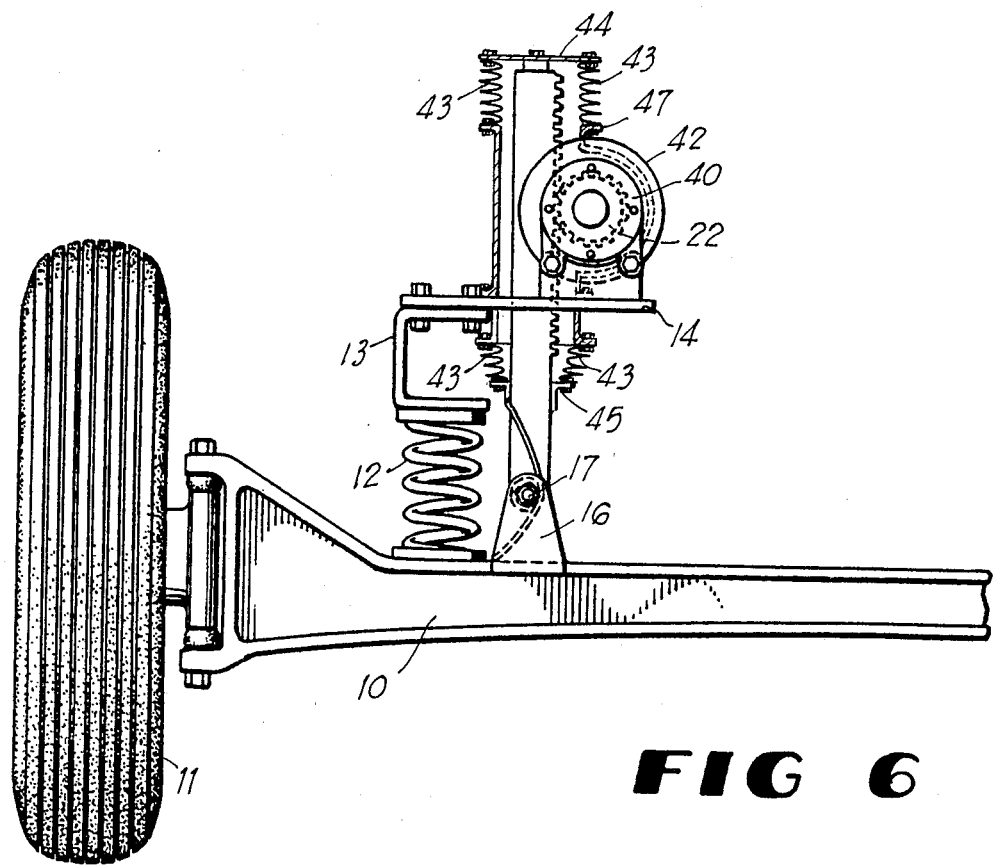
FIG. 6 is a view similar to FIG. 1 showing a modification of the invention.

In FIG. 6 of the drawings, the invention above-described is modified only to the extent that the reciprocating rack bar 15 is spring-loaded in both directions of travel as by loading springs 43 connected between bracket means 44 and 45 on the rack bar and between holding members 46 and 47 fixed to the platform extension 14.

When using my invention, it is preferable that the tires be fully inflated since this will increase the movement of rack bar 15 and improve the operation of my system.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a system for generating electrical power for a vehicle having a relatively movable frame member and axle connected by a resilient suspension, a pair of opposing rotary current generating devices mounted in coaxial relationship on said frame member, flywheel means connected directly to and rotatable respectively with said generating devices for respectively maintaining the rotation of said devices during periods in which no external force is applied thereto, direct driving means including an alternately oppositely rotating element common to the generating devices connected with and driven by said axle during the rise and fall thereof relative to the frame member, and oppositely active and inactive one-way rotational drive means respectively connected between said generating devices and said alternately oppositely rotating element.

2. In a system for generating electrical power as defined in claim 1, said direct driving means further including a rack bar connected with and reciprocated by said axle responsive to the rise and fall of the axle and being drivingly engaged to said alternately oppositely rotating element, and said element comprising a pinion.

3. In a system for generating electrical power as defined in claim 2, and spring means on said axle connected with the rack bar to bias the teeth of the rack bar into mesh with the teeth of the pinion.

4. In a system for generating electrical power as defined in claim 3, and additional snubbing spring means connected with opposite end portions of said rack bar.

5. In a system for generating electrical power as defined in claim 1, and said oppositely active and inactive one-way rotational drive means comprising a pair of coaxial shafts connected between said alternately oppositely rotating element and shafts of said current generating devices, and one-way active, one-way inactive ratchet drives for said shafts having driving connections with the shafts and having driven connections with said alternately oppositely rotating element.

6. In a system for generating electrical power as defined in claim 5, said ratchet drives comprising toothed ratchet collars fixed on said shafts, and coacting driving coil springs surrounding said shafts and having one-way driving terminals engaged with the one-way driving ratchet teeth of said collars and having opposite end terminals drivingly connected with said alternately oppositely rotating element.

7. In a system for generating electrical power as defined in claim 6, and said direct driving means including a rack bar connected with and reciprocated by said axle and being drivingly engaged with said element, and said element comprising a pinion gear.

8. In a system for generating electrical power as defined in claim 5, wherein said flywheel means are respectively on the shafts of said current generating devices between said generating devices and their drive means.

9. In a system for generating electrical power as defined in claim 1, and said direct driving means further including a reciprocating drive element connected with said axle, a platform extension on said frame member and supporting said current generating devices, and guide bearing means for said reciprocating drive element on the platform extension.

* * * * *